United States Patent [19]

Menne

[11] Patent Number: 6,131,328
[45] Date of Patent: *Oct. 17, 2000

[54] ARTIFICIAL LURE ARRANGEMENT FOR SPORT FISHING

[76] Inventor: Holger Menne, Bonner Str. 60, 41468 Neuss, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/985,717

[22] Filed: Dec. 5, 1997

[30] Foreign Application Priority Data

Nov. 22, 1996 [DE] Germany ............................ 296 21 451

[51] Int. Cl.[7] .................................................. A01K 85/18
[52] U.S. Cl. .......................................... 43/42.22; 43/42.35
[58] Field of Search ................ 43/42.06, 42.22, 43/42.31, 42.35

[56] References Cited

U.S. PATENT DOCUMENTS

| 3,357,124 | 12/1967 | Stepacoff et al. | 43/42.22 X |
| 3,708,903 | 1/1973 | Bercz et al. | 43/42.35 X |
| 4,850,132 | 7/1989 | Motyka | 43/44.2 |
| 5,170,579 | 12/1992 | Hollinger | 43/42.06 |

FOREIGN PATENT DOCUMENTS

| 1563973 | 4/1980 | United Kingdom | 43/42.22 |

*Primary Examiner*—Robert P. Swiatek
*Attorney, Agent, or Firm*—Liniak, Berenato, Longarce & White, LLC

[57] ABSTRACT

An artificial lure arrangement for sport fishing. The artificial lure has a basic body that can be secured to a fishing line. The basic body can be shaped in approximately the shape of a fish, or can be configured in imitation of a fish head. A paddle may extend from the underside of the basic body. The basic body can have a cavity therein which can be filled with a liquid or the like to adjust the density of the basic body. This advantageously permits adjustment of an immersion depth of the lure arrangement. The liquid or the like can be introduced into the cavity from the outside of the body, through a closable opening. A spear element can be movably attached to the basic body. Dead bait fish, rubber fish, twister or the like can be slid onto the spear element.

20 Claims, 2 Drawing Sheets

12# ARTIFICIAL LURE ARRANGEMENT FOR SPORT FISHING

FIELD OF THE INVENTION

The invention concerns an artificial lure arrangement for sport fishing, having a basic body that can be secured to a fishing line and is configured in approximately the shape of a fish, and/or has means for attaching a dead bait fish, rubber fish, twister, or the like.

BACKGROUND OF THE INVENTION

Plastic lures for sport fishing are known in a variety of embodiments. There are, for example, so-called "wobblers," which are plastic imitations of fish to which one or more fishhooks can be secured. It is also known to impale a dead bait fish, soft rubber fish, or twister onto a spear as bait. This embodiment has the advantage over the wobbler that the dead bait fish and soft rubber fish move in the water and are thus fairly realistic.

A disadvantage of the use of lures made of plastic is that they generally float on water and must be weighted with lead weights in order to sink. The exact immersion depth is, however, almost impossible for the fisherman to ascertain, so that only in rare cases is the lure suspended at the depth which it should assume when fishing for specific species of fish.

It is therefore the object of the invention to configure an artificial lure arrangement of the type cited initially in such a way that the water depth at which it assumes a suspended state can easily be adjusted.

This object is achieved, according to the invention, by the fact that the basic body is configured as a hollow body; and the cavity of the basic body can be filled from the outside, through at least one closable opening, with a liquid or the like in order to adjust the density of the basic body.

According to the invention a hollow body is thus used which has a density such that it floats on the water or is suspended in the vicinity of the water's surface, but by being filled with, for example, water can be weighted so that it sinks. By appropriate selection of the quantity added, it is thus possible to adjust, practically without limitation, the water depth at which the artificial lure arrangement ultimately assumes its suspended state.

In this context, provision is advantageously made for the fill level of the hollow body to be readable from outside; preferably a scale is provided which indicates a water depth, corresponding to the fill level, at which the artificial lure arrangement assumes its suspended state. This feature gives the fisherman the possibility of adjusting the immersion depth of the lure fairly exactly in accordance with the type of fish he would like to catch and the depth of the body of water.

The opening is preferably closable by means of a plastic stopper. It is also possible, however, to use a screw closure.

Preferably the basic body is filled using a syringe, for example a 10- or 20-ml syringe as is common in the medical field, by means of which the fill level can be adjusted very precisely. For this purpose, the opening has a diameter of no more than 5 mm.

In order to allow the basic body to be easily emptied again, in an embodiment of the invention provision is made for openings to be provided on opposite sides of the basic body that are opened for emptying of the cavity, so that the liquid can be drained out through one opening while air flows in through the other opening.

Advantageously, the basic body is configured so that it assumes a substantially defined position in the water; this can be achieved, for example, by means of an appropriate weight distribution or by arranging fins or flippers or a paddle. A chamber for receiving an attractant can then be arranged in the upper region of the basic body. From this chamber there leads outward an opening which is so small that water cannot enter the chamber when the basic body is immersed in water, but attractants that have been introduced through the opening into the water can emerge underwater, so that predatory fish, in particular, can be attracted.

The basic body can be configured as a hollow wobbler onto which multiple fishhooks are or can be secured.

Alternatively, it is possible to attach a spear element onto the hollow basic body and to impale in a manner known per se onto said spear element, which can in particular be equipped with barbs, a dead bait fish, rubber fish, twister, or the like. In the latter case the spear element is preferably joined movably to the basic body by means of a swivel, as a result of which the lure arrangement moves in the water like a living fish. In this context the basic body is advantageously configured as a fish head, the eyes of which are constituted by the openings.

In an embodiment of the invention, provision is further made for an orifice to be configured in the basic body through which can be guided that end portion of the fishing line on which a fishhook can be or is attached. This embodiment has the advantage that the basic body is not stressed by a large fish.

DESCRIPTION OF THE DRAWINGS

With regard to further advantageous configurations of the invention, reference is made to the dependent claims and to the description below of exemplifying embodiments of the lure arrangement according to the invention. In the drawings.

DETAILED DESCRIPTION OF THE INVENTION

Figure 1:
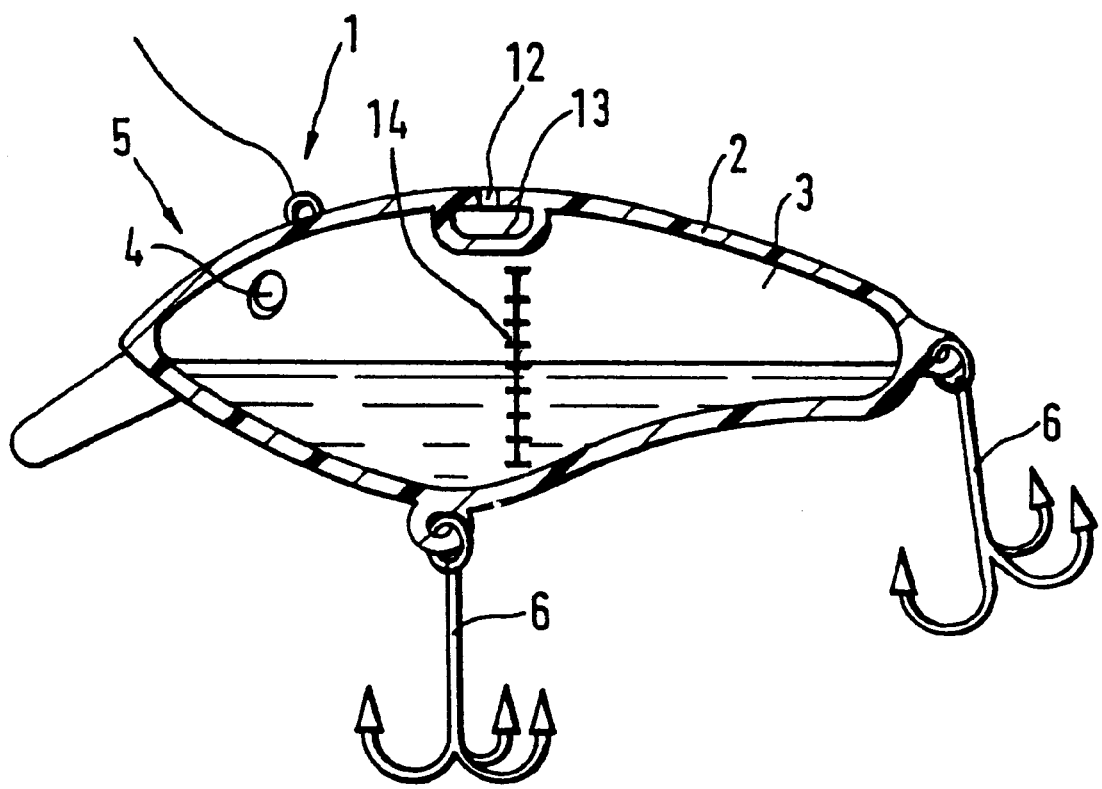
FIG. 1 shows a first embodiment, configured as a hollow wobbler, of an artificial lure arrangement according to the invention.

FIG. 1 depicts a first artificial lure arrangement according to the invention, configured as a hollow wobbler. Said arrangement comprises a basic body 2, which can be secured to a fishing line 1, is configured approximately in the shape of a fish, and carries two fishhooks 6. Basic body 2 consists of hard plastic and is hollow, the density of basic body 2 being in the vicinity of the density of water, so that basic body 2 floats on the water or is suspended in the water close to the water's surface. Cavity 3 of basic body 2 can be filled from outside, through multiple closable openings 4, with a liquid such as, for example, water, or also with sand or the like, in order to increase the density of basic body 2 and thus adjust the depth at which the artificial lure arrangement assumes a suspended state in the water. The more liquid that is located in cavity 3, the deeper the artificial lure arrangement sinks in the water before assuming its suspended state.

As shown in FIG. 1 there is provided on the outside of basic body 2 a scale 14 through which the fill level of cavity 3 can be read from outside, such that the scale 14 indicates a water depth, corresponding to the fill level, at which the artificial lure arrangement assumes its suspended state.

Openings 4 can each be closed off by a stopper 5, and possess a diameter of no more than 5 mm, so that basic body 2 can be filled using a syringe, with the result that a high degree of filling precision can be attained.

The weight distribution and configuration of basic body 2 are selected so that basic body 2 assumes a defined position in the water, as depicted in FIG. 1. In the upper region (in this position) there is configured in basic body 2 a closed chamber 13 that is accessible from outside through an opening 12. The size of said opening 12 is made so small that no water penetrates into chamber 13 when hollow body 2 is immersed in water, even if opening 12 is not sealed. This configuration creates the possibility of introducing gaseous attractants into chamber 13, which emerge from basic body 2 through opening 12 in order to attract, in particular, predatory fish.

Figure 2:
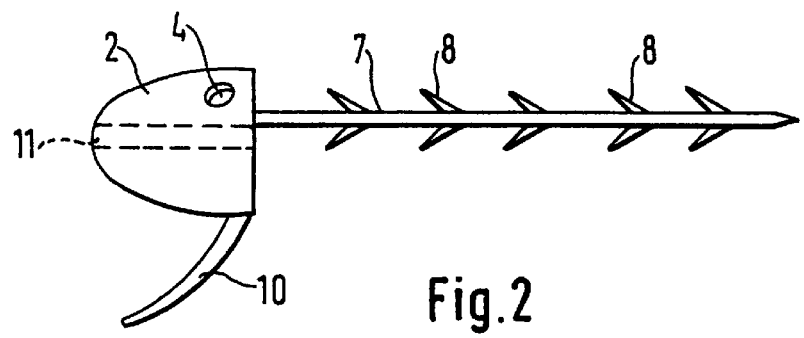
FIG. 2 shows a second embodiment of an artificial lure arrangement according to the invention.

FIG. 2 depicts a further embodiment of an artificial lure arrangement according to the invention. In this embodiment basic body 2 is again hollow, but is much smaller than in the case of the first embodiment, and carries on its rear side a spear element 7 onto which a dead bait fish, rubber fish, twister, or the like can be slid. Barbs 8 provided on spear element 7 ensure secure immobilization in this context.

In the case of the embodiment depicted in FIG. 2, basic body 2 is configured in the manner of a fish head, such that openings 4 for filling arid emptying basic body 2 constitute the eyes of said fish head.

In order for basic body 2 to assume a defined position in the water, it has a paddle 10 on its underside.

Figure 3:
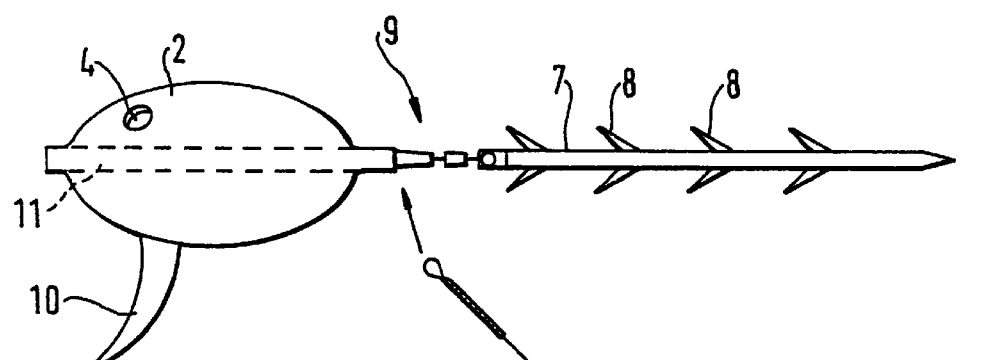
FIG. 3 shows a third embodiment of a lure arrangement according to the invention.
Figure 3:
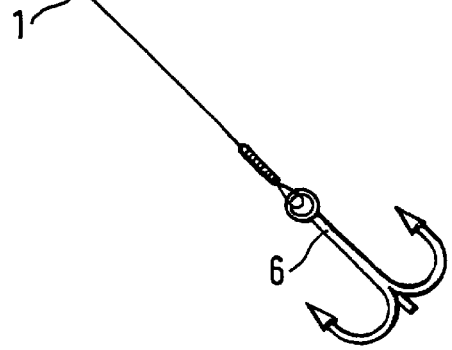

The lure arrangement depicted in FIG. 3 corresponds substantially to the embodiment depicted in FIG. 2, but here spear element 7 is joined not rigidly but rather in substantially freely movable fashion, via a swivel 9, to basic body 2. The result of this is that the lure arrangement is inherently movable, and its behavior in water is thus similar to that of a living fish.

Passing through basic body 2 from its front side to rear side is an orifice 11 through which the fishing line can be pulled in such a way that its free end carrying fishhook 6 emerges at the rear from basic body 2. The result of this configuration is that a large fish does not stress basic body 2.

In the case of the embodiments depicted in FIGS. 2 and 3 as well, a scale 14 indicating the fill level of the cavity can be provided in each case on hollow body 2.

I claim:

1. An artificial lure arrangement for sport fishing, said artificial lure arrangement having a basic body (2) that is securable to a fishing line (1), wherein the basic body (2) is configured in imitation of a fish head with a paddle (10) on its underside and has:
   a cavity (3) which is fillable from the outside through at least one closable opening (4) with a density-adjusting substance to adjust the density of the basic body (2), and
   a substantially linear spear element (7) onto which a fish luring device is slidable, said spear element being movably attached to the basic body (2).

2. The artificial lure arrangement as defined in claim 1, wherein the at least one opening (4) is closable by means of a stopper (5).

3. The artificial lure arrangement as defined in claim 1, wherein the at least one opening (4) has a diameter of no more than 5 mm, so that the basic body (2) can be filled using a syringe.

4. The artificial lure arrangement as defined in claim 1, wherein multiple ones of said at least one opening (4), which are opened for emptying of the cavity (3), are provided on mutually opposite sides of the basic body (2).

5. The artificial lure arrangement as defined in claim 1, wherein the basic body (2) is configured so that it assumes a substantially defined position in the water.

6. The artificial lure arrangement as defined in claim 5, wherein a chamber (13) for receiving an attractant, which has an opening (12) through which the introduced attractants can emerge from the basic body underwater, is configured in an upper region of the basic body (2).

7. The artificial lure arrangement as defined in claim 1, wherein the basic body (2) is configured as a hollow wobbler that is adapted to securely hold at least one fishhook (6).

8. The artificial lure arrangement as defined in claim 1, wherein said spear element (7) has barbs (8).

9. The artificial lure arrangement as defined in claim 8, wherein the spear element (7) is, joined movably to the basic body (2) by means of a swivel (9).

10. The artificial lure arrangement as defined in claim 8, wherein an orifice (10) is configured in the basic body (2) so that an end portion of the fishing line (1) is guidable through the orifice (10).

11. The artificial lure arrangement as defined in claim 1, wherein the basic body (2) is configured so that two of said at least one opening (4) constitute the eyes of said fish head.

12. The artificial lure arrangement as defined in claim 1, wherein a fill level of the basic body (2) is readable from outside of the basic body (2).

13. The artificial lure arrangement as defined in claim 12, further comprising a scale which indicates a water depth, corresponding to a fill level of said cavity at which the artificial lure arrangement assumes a suspended state.

14. The artificial lure arrangement as defined in claim 1, further comprising an amount of said density-adjusting substance in said cavity sufficient to provide a predetermined density of the basic body.

15. The artificial lure arrangement as defined in claim 14, wherein said density-adjusting substance is a liquid.

16. The artificial lure arrangement as defined in claim 14, wherein said density-adjusting substance is sand.

17. An artificial lure arrangement for sport fishing, said artificial lure arrangement having a basic body that is securable to a fishing line, wherein the basic body is configured in imitation of a fish head with a paddle on its underside and has:
   a cavity which is fillable from the outside through at least one closable opening with a density-adjusting substance to adjust the density of the basic body, and
   a substantially linear spear element which slidably carries a fish luring device, said spear element being movably attached to the basic body.

18. The artificial lure arrangement as defined in claim 17, wherein said fish luring device is at least one dead bait fish.

19. The artificial lure arrangement as defined in claim 17, wherein said fish luring device is a rubber fish.

20. The artificial lure arrangement as defined in claim 17, wherein said fish luring device is a twister.

* * * * *